May 4, 1943. G. A. LOVELL 2,318,506

FRICTION AND FLEXURE TESTING DEVICE

Filed Aug. 30, 1939

Inventor:
Glen Allen Lovell
By Eugene M. Giles
Atty.

Patented May 4, 1943

2,318,506

UNITED STATES PATENT OFFICE 2,318,506

FRICTION AND FLEXURE TESTING DEVICE

Glen Allen Lovell, Mishawaka, Ind., assignor to United States Rubber Company, New York, N. Y., a corporation of New Jersey Application August 30, 1939, Serial No. 292,708

9 Claims. (Cl. 73—51)

My invention relates to devices for testing materials such as fabrics or the like and has reference more particularly to a device of this character adapted to flex and rub portions of the material together to test the wearing properties thereof.

In the preparation or selection of fabrics or the like, including laminated and coated materials, it is desirable, for example when such materials are used for upholstering purposes, to definitely ascertain through a quick test its capability of withstanding the treatment to which it may be subjected in actual use. No convenient and reliable means is available for this purpose and it is customary to employ a manual "scrub" test in which a portion of the material is grasped and flexed and rubbed between the hands, although such test is not accurate nor reliable.

Figure 1:
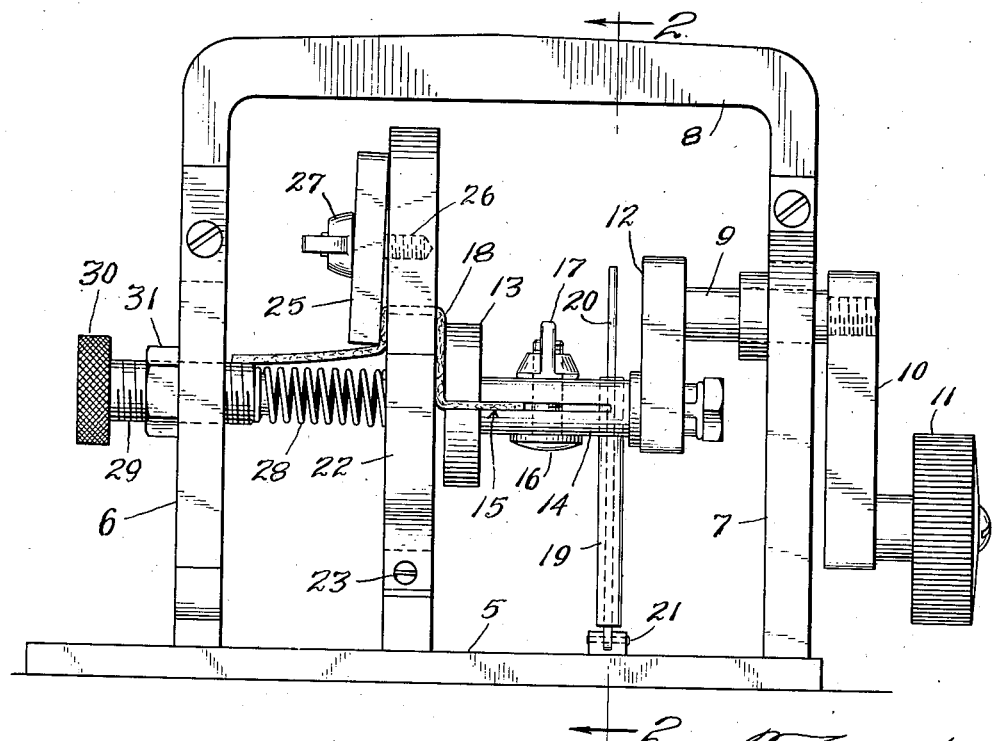
Figure 2:
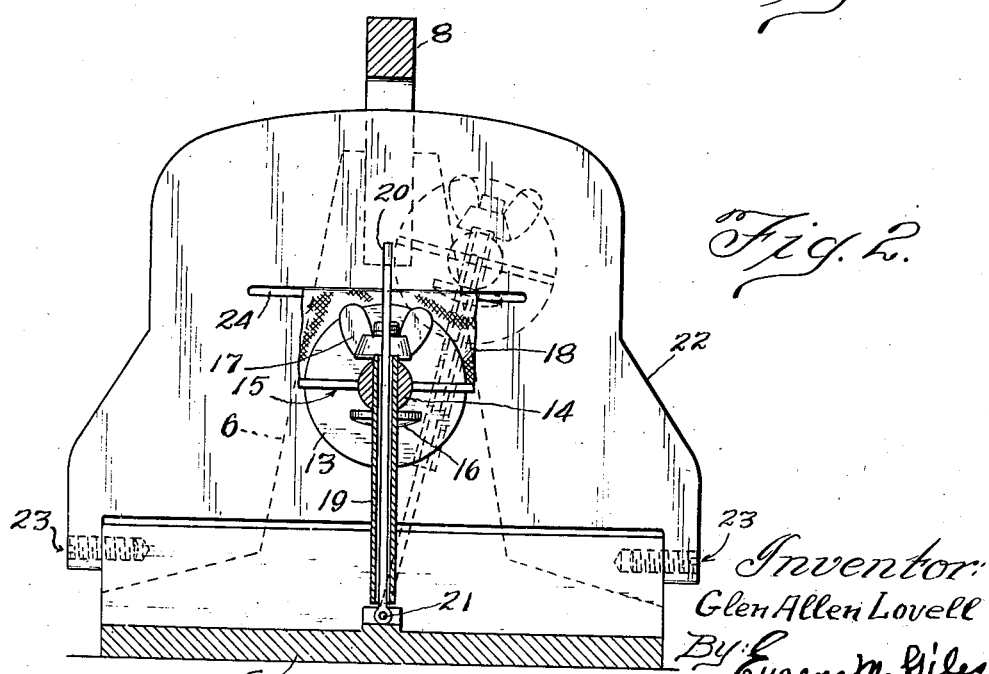

The principal objects of my invention are to provide a simple, and convenient device for testing and determining the wearing, adhesion or other properties of fabrics or the like; to subject the material intensifiedly to conditions similar to those to which it may be subjected in actual use; and to permit such testing to be accomplished quickly and accurately; these and other objects being accomplished as pointed out hereinafter and as shown in the accompanying drawing in which:

Fig. 1 is a side view of a testing device constructed in accordance with my invention; and Fig. 2 is a cross sectional view thereof taken on the line 2—2 of Fig. 1.

Referring to the drawing the reference numeral 5 indicates the supporting base of the device and 6 and 7 two standards which are fixed to and extend upwardly from the base in spaced relation and are connected at their upper ends by a bail like member 8 which may serve as a carrying handle.

A shaft 9 is journaled in the standard 7 and provided at its outer end with a crank 10 having a handle 11 by which it is manually operable to rotate the shaft 9, which said shaft also has a crank 12 at its inner end carrying a disk like head 13 with an elongated stem 14 which is rotatably mounted in the outer end of the crank 12. The head 13 and stem 14 are correspondingly diametrically slotted as at 15 and a bolt 16 is passed through the two halves of the slotted stem 14 and provided with a wing nut 17 so that the slotted head 13 may be employed as a clamp to engage the material to be tested which is indicated at 18. Near the mounted end of the stem 14 the latter is provided with a laterally extending tube 19 forming a guide for a rod 20 which is pivoted at 21 to the base 5 and serves to prevent rotation of the stem 14 and head 13 as these parts are moved in a circular path by rotation of the shaft 9 although it will be apparent, from the dotted line showing thereof in Fig. 2 that this tube 19 and rod 20 arrangement imparts an oscillatory movement to the head 13 and stem 14 as the shaft 9 is rotated.

Opposed to the front face of the head 13 is a pressure plate 22 hinged at the bottom as indicated at 23 to swing to and from the head 13 and provided with a transverse slot 24 at the elevation of the axis of the shaft 9 to accommodate one end of the material 18 to be tested, a clamping plate 25 being provided which is loosely engaged on a threaded stem 26 which projects laterally from the plate 22 and is provided with a wing nut 27 by which the plate 25 is operable to clamp the material 18 as indicated in Fig. 1 and hold same during the testing operation.

A coil compression spring 28 is interposed between the plate 22 and standard 6 to yieldingly urge the plate 22 toward the head 13, the outer end of this spring preferably being seated on the inner end of an adjusting screw 29 which is threaded through the standard 6 and operable by the knurled head 30 to regulate the tension of the spring 28. A lock nut 31 may be provided on the stem 29 to secure same in the adjusted position.

In the operation of this device a small piece of the material to be tested, preferably somewhat wider than the head 13, has one end inserted and clamped in the slot 15. Then while the head 13 is in the lowermost position, as shown in Figs. 1 and 2 the other end of the material 18 is inserted through the slot 24 and clamped therein by the clamping plate 25, it being understood that the pressure plate 22 may be retracted against the tension of the spring 28 if necessary to facilitate insertion of the material in the slot 24 and that the length of material 18 between the slots 15 and 24 is preferably merely sufficient to permit free circular movement of the head and cause the material to lie flat between the head 13 and pressure plate 22 when the head is at the upper and lower limits of its circular movement.

With the material 18 thus held in the device, and the adjusting screw 29 set at the proper tension for testing, the crank 10 is operated so as to move the head 13 circularly in front of the pressure plate 22 and as said plate is yieldingly urged toward the head 13, the upward movement of the head 13 will progressively fold the interposed material 18 and rub the opposed surfaces of the folded portion together while maintained under pressure of the spring 28 until the upper limit of movement of the head 13 is reached, at which point the interposed material lies substantially flat between the head 13 and plate 22 and then in the further movement of the head downwardly the interposed material 18 will be progressively folded in the reverse direction to that occurring in the upward movement of the head 13 and the then opposed surfaces of the folded portion will be rubbed together. Furthermore in each circular cycle of the head 13 the latter is given a slight twist or oscillation about the axis of the stem 14 by reason of the engagement of the rod 20 with the tube 19 of the stem and this progressively varies the direction of the fold line during the upward and downward movements of the head 13 and increases the severity of the test.

The crank 10 is operated a counted number of revolutions until the material 18 shows a selected extent of break down under the test and, the spring being set at a predetermined tension, the number of revolutions of the crank 10 required to effect the selected extent of break down is indicative of the wearing or enduring properties or characteristics of the material.

Preferably the device is employed for comparative testing, a selected material and the number of revolutions of the crank 10 for break down thereof being selected as a standard, and upon testing other materials, with the same tension of the spring 22 as in the standard test, the number of revolutions of the crank 10 required for corresponding break down of such other material serves in comparison with the number of revolutions of the crank 10 for the standard test to indicate the comparative wearing and endurance quality of such other tested material.

Obviously the character of the material tested and the frictional properties of its surfaces may modify to some extent the action occurring between the head 13 and pressure plate 22, for example a smooth surfaced material will fold and rub more readily than a pile surfaced or somewhat rough or tacky surfaced material, but I have found that the action of the material in any event gives a very accurate index to the wearing and endurance qualities of the material which corresponds to the wearing and endurance qualities thereof as demonstrated or determined by actual use.

Various materials may, of course, be tested with this device in addition to what are commonly regarded as fabrics so long as they have the necessary flexibility to respond to the test, and the device is also effective to test coated and laminated materials to determine the wearing properties of the coating or laminations and also the adherence of the coating to its backing material or of the laminations to one another.

While I have shown and described my invention in a preferred form, I am aware that various changes and modifications may be made therein without departing from the principles of my invention, the scope of which is to be determined by the appended claims.

I claim as my invention:

1. In a testing device of the class described, the combination of a frame, a shaft journaled in said frame and having a testing member pivoted eccentrically thereon, another testing member having a testing surface adjacent to and yieldingly urged toward the first mentioned testing member and each testing member including means to secure thereto one end of a portion of the material to be tested, and means to rotate said shaft.

2. In a testing device of the class described, the combination of a frame, a shaft journaled in said frame and having a testing member pivoted eccentrically thereon, another testing member having a testing surface adjacent to and yieldingly urged toward the first mentioned testing member and each testing member including means to secure thereto one end of a portion of the material to be tested, means to rotate said shaft, and facilities to impart a limited pivotal movement to said first mentioned testing member while said shaft is rotated.

3. In a testing device of the class described, the combination of a pair of opposed rubbing members, each cooperable with the other to engage and rub material therebetween, means for holding a strip of material between the rubbing members, a rotatable member having one of the rubbing members eccentrically mounted thereon to swing in a circular path about the axis of rotation of said rotatable member, and means for rotating said rotatable member.

4. In a testing device of the class described, the combination of a pair of rubbing members at least one of which is arranged in yieldable opposed relation to the other, means for holding a strip of material between the rubbing members, a rotatable member having one of the rubbing members eccentrically connected therewith to swing in a circular path about the axis of rotation of said rotatable member, and means for rotating said rotatable member.

5. In a testing device of the class described, the combination of a pair of opposed rubbing members, each cooperable with the other to engage and rub material therebetween, means for holding a strip of material between the rubbing members, a rotatable member having one of the rubbing members eccentrically mounted thereon to swing in a circular path, an orientation controller for the latter rubbing member restricting turning movement thereof as it swings in the circular path, and means for rotating said rotatable member.

6. In a testing device of the class described, the combination of a pair of opposed rubbing members, each cooperable with the other to engage and rub material therebetween, means for holding a strip of material between the rubbing members, a rotatable member having an eccentric connection with one of the rubbing members to move the latter in a circular path, controlling means for the latter rubbing member operable to impart oscillatory movement thereto during its movement in said circular path.

7. In a testing device of the class described, the combination of a pair of rubbing members having opposed faces cooperable to yieldingly engage and rub material therebetween, each face having an opening therein to receive and hold a portion of the material, and means for supporting and moving one of said members so that the opening therein moves in a circular path around the center of the other opening.

8. In a testing device of the class described, the combination of a pair of rubbing members having opposed faces cooperable to yieldingly engage and rub material therebetween, each member having an elongated slot to receive and hold a portion of the material, and means for supporting and moving one of said members so that the slot therein moves crosswise and lengthwise of the other slot and at an angle thereto.

9. In a testing device of the class described, the combination of a pair of opposed rubbing members, each cooperable with the other to engage and rub material therebetween, means for holding a strip of material between the rubbing members, a rotatable member having one of the rubbing members eccentrically mounted thereon to swing in a circular path about the axis of rotation of said rotatable member, means for rotating said rotatable member, and means for imparting oscillatory movement to said rubbing member as it swings in a circular path as aforesaid.

GLEN ALLEN LOVELL.